United States Patent Office 3,487,393
Patented Dec. 30, 1969

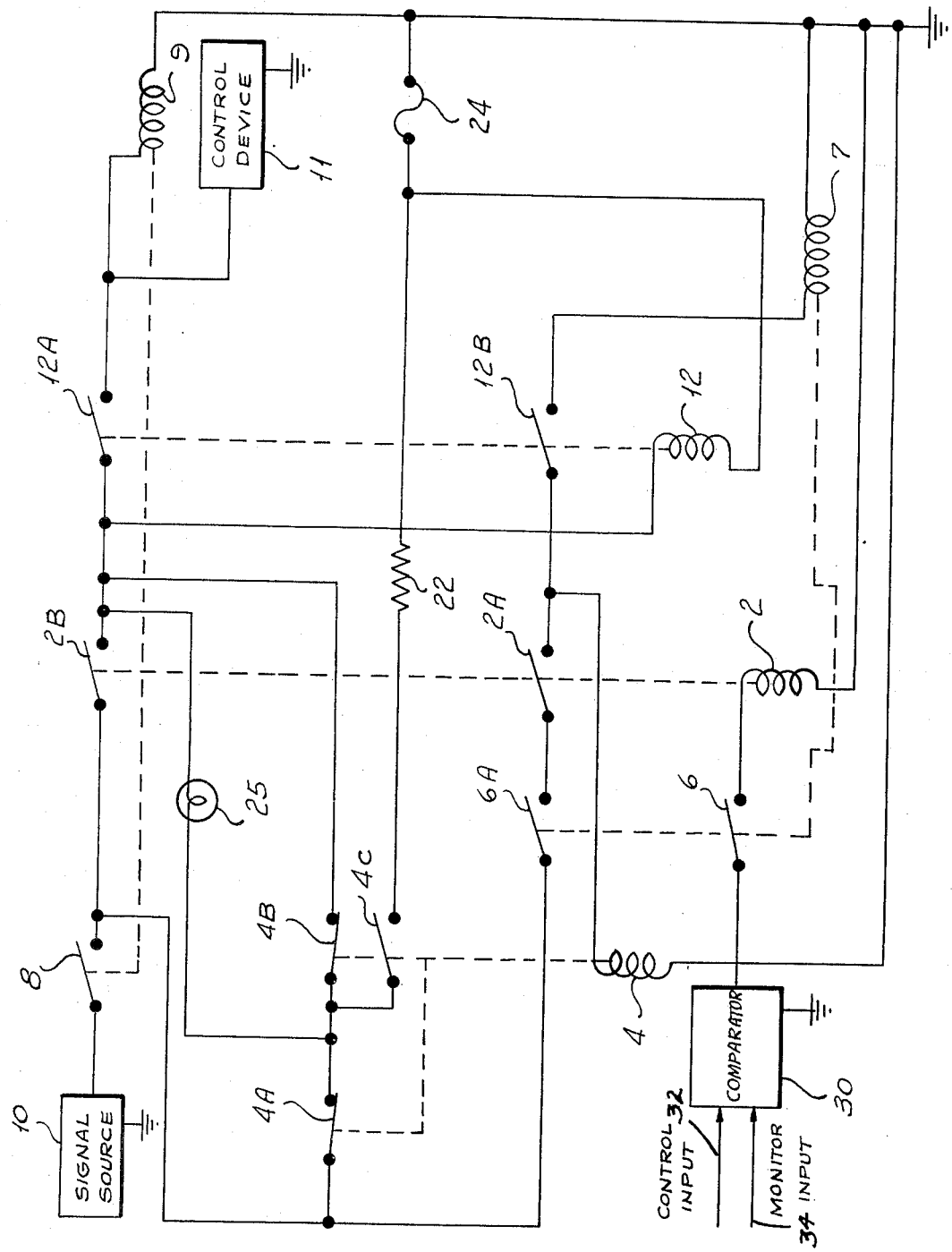

3,487,393
FAIL SAFE SIGNAL TRANSMITTING NETWORK
William W. Medlinski, Clifton, N.J., assignor to The
Bendix Corporation, a corporation of Delaware
Filed Feb. 16, 1967, Ser. No. 616,591
Int. Cl. G08b 23/00
U.S. Cl. 340—213              9 Claims

ABSTRACT OF THE DISCLOSURE

A fail safe network for connecting a signal source to a control device through a plurality of signal transmitting paths including switching means for automatically substituting one transmitting path for another and an indicator for indicating the substitution. The control device and a disconnect device are connected in parallel to the signal source and the disconnect device is current sensitive and disconnects the control device from the signal source when a malfunction occurs in the substitution.

BACKGROUND OF THE INVENTION

Field of the invention

The present invention relates to transferring an electrical control system from one operating condition to another and, more particularly, to means for indicating when the transfer has been achieved and when the system is operating properly under the other condition.

Description of the prior art

To insure safe automatic landings flight control systems must be monitored during the landing mode. Heretofore, flight control systems were monitored throughout the entire flight because no effective fail safe means was available for indicating transfer from an unmonitored to a monitored condition when landing the aircraft. Monitored flight control systems of this kind are complex and take up excessive weight and space, and suffer an associated loss in reliability.

SUMMARY OF THE INVENTION

The novel arrangement of the present invention indicates when the flight control system is monitored and operating properly. The arrangement includes a network for transmitting a system engage signal from a signal source to a system engage device and has a normally open first path and a normally closed second path for connecting the signal source to the system engage device. When the system is unmonitored the engage signal is transmitted over the second path and when the system is monitored proper operation of the system causes the second path to open and the first path to close so that the signal is transmitted over the second path. An indicator is arranged in relation to the first and second paths so as to provide an indication only when the first and second paths have been properly closed and opened, respectively. The system engage device and a disconnect device are connected in parallel with the signal source, and the disconnect device is arranged in relation to the second path so as to disconnect the engage device from the signal source when the second path has not been properly opened.

One object of this invention is to provide a fail safe network for connecting a signal source to a control device through a plurality of signal transmitting paths including means for automatically substituting one transmitting path for another in response to a condition and an indicator for indicating the substitution.

Another object of this invention is to connect the control device and a disconnect device to the signal source so that the control device is disconnected from the signal source when a malfunction occurs in the substitution.

Another object of this invention is to provide means for indicating when a flight control system is transferred from an unmonitored to a monitored condition when landing an aircraft, and for indicating when the system is operating properly in the monitored condition so as to eliminate monitoring throughout flight and to simplify the flight control system.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The single figure in the drawing is an electrical schematic diagram showing the novel signal transmitting network of the present invention.

A signal source 10 provides a signal at a suitable direct current level for energizing a control device 11 such as a device for engaging a flight control system.

The flight control system is engaged by closing a switch 8. When the system is operating unmonitored, the signal is applied through the switch 8 and through normally closed relay contacts 4A and 4B to a relay 12 grounded through a fuse 24. Relay 12 is energized and closes a normally open relay contact 12A which connects signal source 10 to control device 11, and closes a normally open relay contact 12B. Closed relay contact 12A also connects signal source 10 to a grounded solenoid 9 for holding switch 8 closed.

The system is transferred from an unmonitored to a monitored condition by manually or automatically closing a ganged switch having contacts 6 and 6A. Switch contact 6A is connected to switch 8 and switch contact 6 is connected to a comparator 30 which receives a system control input 32 and a monitor input 34, and provides an output when the difference between the inputs 32 and 34 is within a predetermined limit indicating proper operation of the system. The signal from comparator 30 is applied through switch contact 6 to a grounded relay 2 which is energized by the signal and closes a normally open relay contact 2B connected between switch 8 and relay contact 12A, and closes a normally open relay contact 2A connected to switch contact 6A.

When switch contacts 6 and 6A are closed and the system is operating properly, signal source 10 is connected through switch 8, switch contact 6A and closed relay contact 2A to a grounded relay 4. Relay 4, when energized by the signal from signal source 10, opens normally closed relay contacts 4A and 4B and closes a normally open relay contact 4C connected between relay contacts 4A and 4B and to fuse 24 through a resistor 22.

The signal from signal source 10 is applied through switch 8 and closed relay contact 2B to relay 12. Relay 12 is energized and holds relay contact 12A closed to connect signal source 10 to control device 11, and holds relay contact 12B closed.

Signal source 10 also is connected through switch 8, switch contact 6A, closed relay contact 2A and closed relay contact 12B to a grounded solenoid 7, which when energized by the signal from signal source 10 holds switch contacts 6 and 6A closed.

An indicator lamp 25 is connected between relay contacts 2B and 12A and between relay contacts 4A and 4B, and is connected with resistor 22 in the circuit between signal source 10 and fuse 24 through the switch 8 and closed relay contacts 2B and 4C. With this arrangement the indicator lamp 25 will light only when contacts 2B and 4C are closed and contacts 4A and 4B are open. Any other condition of the aforenoted relay contacts will either short out indicator lamp 25 or open fuse 24, disconnecting signal source 10 from control device 11. For example, if contact 2B is open, indicator 25 will be shorted out. If contact 2B is closed and either contact 4A or 4B is closed, indicator 25 will be shorted out and the signal from signal source 10 applied through the closed contact 4A or 4B, the closed contact 4C and the resistor 22 opens the fuse 24 to de-energize relay 12. Contact 12A opens and disconnects signal source 10 form control device 11.

Resistor 22 limits the signal to fuse 24 to a value which will normally open fuse 24 thereby preventing damage to the relay contacts or switches in the network in the event the signal from signal source 10 is shorted through contact 4A or contact 4B. If contact 4C is open when indicator 25 is shorted out, the system is still fail safe since indicator 25 will not shown an "on" indication.

The novel device of the present invention provides means for indicating when the system is transferred from an unmonitored to a monitored condition. All possible failures in the transfer, as well as improper operation of the monitored system, result in an "off" indfication. The signal source is disconnected from the control device in the event of malfunctions which would otherwise cause damage to components in the network.

Although relays have been used to illustrate the novel features of the present invention, any other logic level devices either permitting or restraining signal transmission may be used as well.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In an electrical system in which a signal from a signal source is transmitted to means controlled by the signal, a transmitting network comprising:

a first transmitting path for connecting the signal source to the controlled means and including normally open first and second switching elements;

a second transmtiting path for connecting the signal source to the controlled means, and including normally closed third and fourth switching elements and the normally open second switching element;

a third transmitting path connected to the signal source in parallel with the controlled means and including the normally closed third and fourth switching elements, actuating means for actuating the normally open second switching element and a disconnect device, said signal being applied through said third path for energizing the actuating means to close the normally open second switching element so that the signal is transmitted to the controlled means through the second path;

a normally open fifth switching element connected intermediate the normally closed third and fourth switching elements and between the actuating means and the disconnect device;

a fourth transmitting path connected to the signal source in parallel with the controlled means and including the normally open first switching element, the actuating means and the disconnect device;

means responsive to a condition for opening the third and fourth switching elements and for closing the first switching element so that the signal is applied through the fourth path for energizing the actuating means to close the normally open second switching element so that the signal is transmitted to the controlled means through the first path, and for closing the fifth switching element;

an indicator connected intermediate the first and second switching elements and intermediate the third and fourth switching elements and providing an indication only when the first, second and fifth switching elements are closed and when the third and fourth switching elements are opened in response to the condition; and said disconnect device being responsive to said input signal transmitted through the closed fifth switching element when only one of said third and fourth switching elements are opened in response to the condition for disconnecting the third path so as to de-energize the actuating means to open the second switching element and to disconnect the control means from the signal source.

2. In an electrical system in which a signal from a signal source is transmitted to means controlled by the signal a transmitting network comprising:

first means connected to the signal source and initially ineffective for transmitting the signal;

second means connected to the signal source and initially effective for transmitting the signal;

third means connected to the first and second means and to the controlled means and initially ineffective for transmitting the signal;

fourth means connected to the first and second means in parallel with the controlled device and including an actuating device for the third means and a disconnect device, said signal being transmitted through the second means for energizing the actuating device to render the third means effective to transmit the signal so that the signal is transmitted to the control device through the second and third means;

fifth means connected to the second means and connected to the fourth means between the actuating device and the disconnect device and initially ineffective for transmitting the signal;

condition responsive means for rendering the second means ineffective and for rendering the first and fifth means effective for transmitting the signal so that the signal is transmitted through the first means for energizing the actuating device to render the third means effective to transmit the signal, said signal being transmitted to the control device through the first and third means;

an indicator connected to the first means and the third means and connected to the second means and the fifth means and providing an indication only when the first, third and fifth means are effective for transmitting the signal and when the second means is ineffective for transmitting the signal; and said disconnect device being responsive to the signal transmitted through the fifth means when the first, second, third and fifth means are effective for transmitting the signal for de-energizing the actuating device to render the third means ineffective for transmitting the signal so as to disconnect the control means from the signal source.

3. A transmitting network as described by claim 2, wherein:

the first means includes a normally open first switching element;

the second means includes normally closed third and fourth switching elements;

the fifth means includes a normally open fifth switching element; and the condition responsive means includes means for providing a control signal and actuating means energized by the control signal for closing the first and fifth switching elements and for opening the third and fourth switching elements.

4. A transmitting network as described by claim 2, wherein:

the fourth means is connected between the first means and the third means and between the second means and the third means in parallel with the controlled device.

5. A transmitting network as described by claim 3, wherein:
the fifth means is connected to the second means between the third and fourth switching elements; and
the indicator is connected to the second means between the third and fourth switching elements so as to provide an indication when only one of said switching elements is opened in response to the condition.

6. A transmitting network as described by claim 3, wherein the actuating means included in the condition responsive means comprises:
a sixth normally open switching element connected to the signal source;
a first actuating device connected to the control signal means and energized by the signal therefrom to close the first switching element and the sixth switching element; and
a second actuating device connected to the sixth switching element and energized by the signal from the signal source applied therethrough to open the third and fourth switching elements and to close the fifth switching element.

7. A transmitting network as described by claim 2, including:
a first switch for connecting the first and second means to the signal source;
a third actuating device connected to the third means; and
said switching means being closed to connect the signal source through one of the first and second means and through the third means to the third actuating device and to the controlled means so that the third actuating device is energized by the signal from the signal source to hold the switch closed when one of the first and second means and the third means is effective for transmitting the signal.

8. A transmitting network as described by claim 2 including a resistor connected between the actuating device for the third means and the disconnect device.

9. A transmitting network as described by claim 6 including:
a second switch for connecting the signal source to the sixth switching element and for connecting the control signal means to the first actuating device;
a normally opened seventh switching element connected to the sixth switching element;
a fourth actuating device connected to the seventh switching element;
said second switch being closed to connect the signal source to the sixth switching element and to connect the control signal means to the first actuating device; and
the actuating device for the third means being effective to close the seventh switching element when the signal from the signal source is transmitted through one of the first and second means so that the fourth actuating device is energized by the signal applied through said second switch and the closed sixth and seventh switching elements to hold the second switch closed.

References Cited

UNITED STATES PATENTS 2,752,588   6/1956   Marmorstone ____ 340—213.1 X
2,769,973   11/1956   Denholm et al. __ 340—213.1 X THOMAS B. HABECKER, Primary Examiner CHARLES M. MARMELSTEIN, Assistant Examiner U.S. Cl. X.R.

307—115; 333—3